Patented Mar. 6, 1934

1,949,799

UNITED STATES PATENT OFFICE 1,949,799

INSECTICIDAL OIL SPRAY

Hugh Knight, Claremont, Calif., assignor to Standard Oil Company, Chicago, Ill., a corporation of Indiana No Drawing. Application February 16, 1933
Serial No. 657,108

18 Claims. (Cl. 167—43)

This invention relates to an insecticidal oil spray and it pertains more particularly to means whereby oil may be rendered effective against plant parasites, such as scale, coddling moth, red spider, etc., without being absorbed by the surfaces on which it is sprayed and without injury to sensitive foliage. The invention relates chiefly to the regulation of oil penetration into plants, leaves or fruits and to the regulation of oil film thickness, angle of contact, permanence of oil film, and the ability of the oil to kill parasites without being absorbed by the plant surface.

The effectiveness of oil as an insecticide has long been known. Attempts have been made to prevent plant injury by regulating oil viscosities, gravities, volatilities, concentrations, and degrees of refinement, but all of these attempts have failed. Volatile oils, such as kerosene, are not effective in small concentrations because they disappear too rapidly, both by vaporization and by absorption into plant leaves. If used in larger concentrations, light volatile oils cause leaf burn and numerous other plant injuries. For a time it was thought that highly treated viscous oils such as white oils could be used with safety on foliage, but it was found that much of the deleterious action of oil on foliage was physical rather than chemical and that the percent of "unsulfonatable residue", etc. was not the only measure of plant safety. The hand book of "Citrus Insect Control" (1928), pages 30–31, enumerates the effect of heavy white oils on foliage as follows:

"The bad effects which have been noted on oranges in some degree since highly refined heavy oil sprays have been used are numerous. They include retarding of blossoming; reduction of blossoming; reduction of crop; retarding fruit colorization; interfering with normal sweat room coloring; drop of immature fruit; drop of mature fruit; roughened texture; mummifying of fruit; increasing crystallization; producing insipid flavor; decrease in acidity, soluble solids and sugars; increase of dead wood; occurrence of fruit burn and leaf drop; difficulty in cleaning fruit and gumming up packing house conveyors.

"This formidable array of spray troubles have been attributable almost entirely to the very heavy application of 1½% to 3% heavy oils such as Volck concentrate during the autumn, winter or spring. Some of these troubles were costly to the grower. For instance, extreme application of the heaviest oil sprays on Valencias during October and November in some cases reduced the succeeding crop as much as 50%, and affected the quality of the fruit then on the trees."

Again in Plant Physiology 4 (1929), page 306, it is stated:

"It seems desirable to emphasize the fact that mere lack of 'corrosive' qualities or the possession of 'neutrality' or 'chemical inertness' on the part of an oil does not imply that it is without deleterious effects when applied to living plants."

The injury caused by oil appears to be chiefly physical in nature and it is due to either (1) suffocation of the leaf due to interference with plant respiration or (2) a metabolic disturbance in the plant caused by oil penetration which interferes with the synthesis of starch in the leaves and which prevents translocation of synthesized starch from the leaf to the other parts of the plant. The object of my invention is to prevent the penetration of oil into leaves or plant structure so that these functional disturbances will be avoided and at the same time to maintain an oil film on the surface of the leaf for a sufficient period of time to kill plant parasites and for an insufficient period of time to cause plant suffocation. In other words, the object of my invention is to regulate the penetration of oils into leaves and at the same time to regulate the deposit and persistence of the oil film on the leaf in such a manner that the oil will be effective as an insecticide and non-injurious to the plant.

In the application of oil spray emulsions three factors are of importance,—(1) the interfacial tension between oil and water, (2) the interfacial tension between the oil and the leaf after the water has evaporated, and (3) the tendency of the oil to penetrate the leaf. My invention plays an important part in (1) because it assures intimate dispersion of the oil in water and makes it possible to regulate the amount of oil that can be deposited at any concentration without sacrificing coverage,—makes it possible to reduce the film thickness of heavy oil. My invention plays an important part in (2) because it apparently changes the angle of contact between kerosenes and the like, and dry plant leaves, thereby making it possible to increase the film thickness of these oils on leaves after the water is evaporated. My invention plays what is probably its most important role in (3) because it prevents both light and heavy oils from penetrating the plant structure, at least to an appreciable extent.

Plant leaves have on their surface a waxy material called "cutin". When a drop of water is applied to such a leaf the angle of contact between the water and the leaf is about 90°, and the thickness of the aqueous film may be about 3.3 mm. If glycerine is deposited in the same manner, the angle of contact is approximately 78° and the maximum thickness of the film is about 2.9 mm. Oils show angles of contact and thickness of films varying according to their source, viscosity, method of refinement, etc. An eastern oil of 95 seconds Saybolt at 100° F. gives an angle of contact of 34° and a film 1.4 mm. thick. A western oil of about the same viscosity gives an angle of 35° and a film thickness of 1.5 mm. An eastern oil of 40 seconds viscosity gives an angle of 30° and a film thickness of 1.1 mm. A western oil of 60 seconds viscosity gives an angle of 31° and a film of 1.3 mm. A kerosene having 32 seconds viscosity gives an angle of 17° and a film thickness of 0.7 mm. The Saybolt viscosities hereinabove referred to are those used in the petroleum industry and are perhaps inaccurate in the kerosene ranges; a better relation between viscosity, film thickness, and angle of contact would be obtained if the viscosity could be expressed in absolute units instead of Saybolt units.

I have discovered that the film thickness and the angles of contact of oils may be markedly changed by adding to the oil a suitable solute which, in my preferred embodiment, is glyceryl naphthenate. When about one to ten percent of glyceryl naphthenate is dissolved in the oil, a striking change takes place in its surface tension characteristics. For instance, if a drop of white oil is placed on the surface of a body of water it forms a lens with a definite angle of contact which determines the thickness of the lens. If this same oil contains a small amount of glyceryl naphthenate and if a drop of the solution is deposited on water, it spreads with almost explosive violence, forming a film so tenuous as to be almost indistinguishable. This relationship is maintained as long as the oil and water remain in contact, and this phenomena affords a basis for regulating oil film thickness on plant leaves where the oil is applied in the form of an aqueous emulsion. Instead of film thicknesses of 1.5 mm. in the case of heavy oils, I may obtain film thicknesses of 1.0, 0.1, or even 0.01 mm.

The remarkable effect of the solute on the surface tension characteristics of the oil may also be shown by tests by the Donnan drop-pipette method of measuring surface tension, substituting distilled water as the standard, and allowing a measured quantity of the same to drop from the tip of the pipette while immersed in the oil to be tested. When 10 cc. of water is dropped into a 44 seconds white oil (96% unsulfonatable residue) the drop number is 45. When only 1% of glyceryl oleate is dissolved in the oil, the drop number is increased to 200. Glyceryl naphthenate is far more effective than glyceryl oleate and has the added advantage of being unaffected by hard water.

At the same time I have discovered that the addition of glyceryl naphthenate prevents the absorption of the oil into the leaf. If water is applied to a leaf it does not penetrate the leaf structure but remains on the surface until it is mechanically knocked off or until it has evaporated. Oil, on the other hand, disappears from the leaf surface in a remarkably short time, and since the disappearance of the oil cannot possibly be attributed to vaporization, it must be absorbed by the leaf. This may be demonstrated by coating a glass slide with an oil film of the same thickness as that applied to the leaf. In making such tests I have found that the oil film disappeared from the leaf in three or four days, while the same oil was clearly distinguishable on the glass plate after thirty days. Leaves coated with heavy oil were dry after eight or ten days and the oil was visible on the plate as long as eight months. The glass plate and the leaf in both of these cases were kept under identical conditions in free air and away from dust.

As a result of these tests I adopted the hypothesis that if the oil could be given the surface tension characteristics of water, it would remain on the leaf as long as it remained on the glass slide. In working on this problem I discovered that glyceryl naphthenate imparted to the oil the surface tension characteristics which are shown by water. In other words, I discovered that when small amounts of glyceryl naphthenate are incorporated in the oil, the oil film may be retained on the leaf for greatly increased periods of time, the persistency of the film depending somewhat on the nature (volatility) of the oil and the amount of solute used. This phenomena is one of the outstanding features of my invention and will be explained more fully as the detailed description of my invention proceeds.

The invention also covers the application of oil films on fruit, such as apples which are subject to infestation by coddling moth larvæ. Apples have a wax-like coating which gives them a dull appearance. When an oil spray is applied to such an apple, the surface of the apple becomes shiny, but after a few days it regains its dull appearance. Evidently the oil fluxes with or penetrates through this waxy coating and eventually disappears into the skin of the apple. Consequently, apples sprayed with oil can be immunized only for a few days (U. S. Department of Agriculture Technical Bulletin 281, February 1932) and it is obviously out of the question from the standpoint of cost and convenience to spray an orchard every three days to keep the apples immune from infestation. Furthermore, the deleterious effect of oil in fruit and leaves is cumulative because the plant cannot rid itself of the oil. I have discovered that when a small amount of my solute is incorporated into the oil, the oil does not flux with the wax or penetrate into the apple,—the shiny oil film persists for weeks, and by properly regulating the amount of solute and the character of the oil it may be possible to obtain protection of the orchard with one or two sprayings per season.

Contrary to popular belief, the lighter oils are far more efficient insecticides if they can be kept in contact with the insect. For example, if mealy-bugs be completely immersed in a heavy white oil of 100 seconds viscosity they will remain for seven to ten days before death ensues. If, however, insects of the same species be completely immersed in kerosene, they are killed in approximately 100 minutes. On this basis, kerosene is about 144 times as efficient as the heavy oil. The time factor is an important one and the object of my invention is to make it possible to use sprays of kerosene, naphtha, mineral seal, etc. which are so prepared that they will not penetrate into plant leaves but will remain on the leaf surface for a period of time sufficient to effect the kill.

A further object of my invention is to provide a means whereby inexpensive oils of lower degrees of refinement may be used with safety on plants instead of highly refined white oils. It is known that the components of the oil which are removed by acid treating (sulfonatable) are more effective as insecticides than the remaining white oils, and by preventing the penetration of oils into the leaf I not only reduce the cost of the oil but I make it possible to use oils containing sulfonatable components, thereby increasing the efficiency and effectiveness of the spray.

As above stated, my preferred and outstanding solute is glyceryl mono naphthenate. This is an example of the general class of solutes which can be used in practicing my invention and which may be defined as oil-soluble alkyl hydroxy compounds, such as esters of polyhydroxy compounds, particularly polyhydric aliphatic alcohols, the polyhydric alcohols being only partially esterified by oil soluble acids or by acids to give oil soluble compounds. My purpose is to impart to oil the surface tension and "nonpenetrating" properties of water or glycerine on a plant leaf, and my invention covers the use of all solutes which are known in the art to have this effect. The term glyceryl naphthenate as used herein refers to partially esterified glycerol, such as the mono- or di-esters. The naphthenic acids are preferably those derived from petroleum, in the manner described in Bransky United States Patent 1,681,657. Some naphthenic acids, particularly light Russian and Roumanian petroleum distillates, are composed chiefly of compounds ranging from $C_6H_{11}COOH$ to $C_9H_{17}COOH$. They are probably substituted carboxylic cyclopentanes, such as 1-methyl cyclopentane-2-carboxylic acid, or polycarboxylic acids of cyclopentane or methyl cyclopentane. This may, however, be hexahydro benzoic acids or other carboxylic acid compounds of cyclic poly-methylene hydrocarbons. Instead of naphthenic acids for the partial esterification of my polydroxy compounds I may use higher fatty acids, particularly hydroxy acids such as ricinolein, dehydroxy stearic, etc. or substituted acids of this type, such as acetyl ricinoleic acid and the like.

I may esterify ordinary polyhydroxy alcohols, such as glycol, glycerol, erythritol, arabitol, mannitol, etc.; I may esterify derivatives or substitution products thereof, such as ethylene glycol, butylene glycol, etc., or I may use esters of alkylol amines.

To expedite solution of my solute in the oil I may use a miscibility agent such as butanol, employing say nine parts of the solute to one part of butanol. Other miscibility agents, such as benzol, may be used, but I prefer to use aliphatic hydrocarbons and particularly aliphatic hydroxy compounds. With glyceryl naphthenate no miscibility agent is necessary, but solution is facilitated by first dissolving it in a small amount of warm oil.

When my solute is added to the oil in proportions of 1-10%, no added emulsifying agent is usually necessary. In fact, these solutes, such as glyceryl naphthenate, are such potent emulsifying agents that a "spreader" must be added to make a "quick breaking" emulsion possible. Unless the emulsion is "quick breaking" the oil remains in the water and out of contact with the plant; an extremely stable emulsion would be hardly more effective than water alone. When less than 1% of my solute is employed I may obtain an excellent emulsion, particularly with glyceryl naphthenate, without the addition of any other materials. When more than 1% of glyceryl naphthenate is used I find it necessary to add a "spreader" such as calcium caseinate, preferably a mixture of about 98% calcium caseinate with about 2% aluminum sulphate. Sodium and potassium soaps tend toward the formation of oil in water emulsions and calcium, zinc, magnesium, aluminum soaps or compounds tend toward the formation of invert emulsions, or emulsions of the water-in-oil type. I have found that large percentages of my solute tend to give a stable oil-in-water emulsion, and that to make a "quick breaking" emulsion I must counteract a part of their effect by adding an agent which will tend to cause inversion. Such substances are commonly known in the art as "spreaders", the term referring to the "spreading" of the emulsion on the leaves and not to the spreading of the oil in the water. The amount of solute employed will depend on the nature of the oil used, climatic conditions, nature of plant sprayed, etc., and the amount of spreader used will depend on the amount of solute.

The gist of my invention is the regulation of oil deposition on plant leaves and the regulation of oil penetration into the leaves after it has been deposited.

In practicing my invention I may use any oil from a light kerosene or naphtha to a heavy white oil or lubricating oil. I prefer to use oils of about the viscosity of heavy kerosene or such oils as are referred to in the art as mineral seal oil, viscosity about 40 seconds Saybolt at 100° F. The optimum oil might better be defined by its angle of contact with a waxy surface. I have found that the optimum oils for insecticidal purposes are those which have an angle of contact of about 30-36° when determined on glass slides coated with carnauba wax. Oils varying in viscosity from 40 to over 140 seconds all have an angle of contact within this rather limited range. An oil may only show a slight difference in viscosity and at the same time may show a rather marked departure from this optimum angle of contact. In my preferred embodiment I use low viscosity oils having an angle of contact of 30-36° (on carnauba wax) but it should be understood that I may use less viscous and more volatile oils with increased amounts of solute as will be hereinafter described. My oils need not be highly refined and, in fact, the so-called straw oil in many cases is quite satisfactory ("straw oil" has an unsulfonatable residue of about 80).

For a solute I prefer to use glyceryl naphthenate, but it should be understood that I may use any other oil soluble aliphatic hydroxy compounds as hereinabove pointed out. Glyceryl naphthenates and equivalent substances, as hereinabove defined, will be generically referred to as solutes.

I will describe the invention as employed in a power rig designed to make up 400 gallons of spray at a time. I first clean out the tank, especially if it has been used for lime sulfur sprays with which my sprays are incompatible. I then pour into the empty tank about eight gallons of mineral seal oil (viscosity about 40 seconds Saybolt) containing about 5% of glyceryl naphthenate. Glyceryl naphthenate is particularly advantageous because it is not adversely affected by hard waters. This spray rig has a circulating pump whose inlet is connected to the bottom of the tank and whose outlet discharges into said tank at a point above the bottom thereof. As soon as the oil is poured into the tank I start the circulating pump and start introducing the water. In this way an extremely concentrated emulsion is at first produced, and as the emulsion becomes more and dilute it is constantly agitated by being forced through the pump and back into the tank under pressure while the tank is filling. When the tank is about half full, emulsification is practically complete and I then add the spreader. The addition of the spreader and the manipulation after its addition are extremely important and should be carefully controlled. In this case I use about two pounds of a mixture consisting of 98% calcium caseinate (Kayso) and 2% aluminum sulfate, the mixture having first been dissolved in water. The agitation must be sufficiently violent and the addition of the spreader must be sufficiently slow to prevent complete inversion of the emulsion. Creaming is very rapid after spreader has been added (due to the large size of the globules) and it is important to maintain vigorous agitation from the time the spreader is added until the spray has been actually applied. The mixture that creams fastest and still comes away clean is the one which I prefer to use. When the spray is diluted to 400 gallons I apply it by means of a power spray. If 10% of glyceryl naphthenate is added, the amount of calcium caseinate mixture should be increased to about four pounds. If 1% or less of glyceryl naphthenate is used, the amount of spreader may be markedly decreased or may be eliminated entirely. This solute is an excellent emulsifier and is remarkably well adapted for insecticidal use.

While I have described a preferred method of mixing my emulsion it should be understood that I may use any other conventional means for obtaining an intimate mixture and emulsification of the oil in water. Turbo mixers, paddle wheel mixers, rotating disc mixers, etc. may be used instead of the forced circulation system hereinabove described.

The emulsion should be vigorously stirred or agitated prior to and during application so that there will be no tendency toward settling out. The spray hereinabove described gives a very satisfactory quick-breaking emulsion which, when discharged from the spray nozzle, breaks almost immediately and distributes a thin film of oil on the leaf. Oil emulsified with ordinary emulsification agents, such as gums, soaps, protein materials, etc. will deposit a heavy oil film and the leaves will have a dark green, oil soaked appearance. The same oil can be emulsified and supplied as hereinabove described, so that no physical change can be detected by visual observation, but on careful examination it will be found that an excellent oil film has been applied. The film may be very thin, much lighter than with prior emulsions, and at the same time much more persistent. The former oil spray leaves a film which is absorbed in four or five days, while the oil film deposited by the spray hereinabove described will remain after periods of fifteen to thirty days or more.

As another example of my invention I may dissolve 90% of glyceryl naphthenate in 10% of butanol and add about 8% of this mixture to a kerosene having a viscosity of about 32 seconds. I may then emulsify this kerosene in water to give a 4% oil concentration in the manner hereinabove described, using 16 gallons of oil per 400 gallons of spray, and using about five pounds of the calcium caseinate mixture. When this spray is applied to waxy or cutinized surfaces, the oil does not penetrate into the surfaces but forms a thick film thereon which disappears only by vaporization after an exposure to the atmosphere of several days. Ordinarily the kerosene film would be very thin and would be almost instantly absorbed or vaporized. My solute prevents or retards absorption so that the kerosene persists for a sufficiently long time to be insecticidally efficient. The angle of contact may be increased by adding further amounts of solute and in order to form a thicker film on all of the leaves sprayed it may be necessary to increase the oil concentration of the spray. The precise thickness of the film to be employed will depend somewhat on atmospheric conditions, on the volatility of the oil and on the nature of the parasites which are being combatted. One skilled in the art may choose the optimum oils, concentrations and proportions in view of the principles hereinabove set forth.

Heavy oils will be used in concentrations less than 2% and extremely heavy oils less than 1%. In such oils my solute causes the even distribution of the oil in the aqueous phase so that the film deposited on the leaf is much thinner than the oil film heretofore deposited by these oils. When concentrations of 2% or more of heavy oils are used the oil may persist on the leaf for periods of eight months. This is obviously deleterious to plant respiration and I have found that by using from about 1–10% of my improved solute in the oils and lowering their concentration, the same insecticidal effectiveness may be obtained and the spray will remain on the leaf surface for several weeks or months. If similar quantities of oil were applied to the leaf without the solute the oil would be absorbed by the leaf in a very few days.

As another example of my invention I may add about 2% of glyceryl naphthenate to about four gallons of white rose oil, a highly refined white oil having a viscosity of about 95 to 100 seconds, I may emulsify the mixture in the manner hereinabove described to a volume of about 400 gallons, about two pounds of spreader being added during the mixing step. In this case the oil is dispersed in the water to a greater extent than it would be with ordinary emulsifying agents, and therefore it is spread on the leaf in a thinner film. The presence of the solute in the oil film which remains on the leaf prevents the oil from fluxing with the cutin or penetrating the leaf, and the oil film under ordinary conditions will persist for a period of twenty to thirty days.

To determine insecticidal effectiveness or scale, tests were made on citrus trees loaded with ripe fruit, both valencias and navels. These were infested with black and citricola scale which were large, almost mature, and in the most difficult stage to control (time for regular control had passed by almost four months). Mineral seal oil (40 seconds) was applied by a 400 gallon rig under a pressure of 400 lbs./square inch, the oil containing 5% by volume of glyceryl naphthenate and being applied in an aqueous emulsion containing 2% oil and about one-half pound spreader per 100 gallons of spray. The kill was larger than that obtained with an oil spray of the same concentration without the solute, and at the same time the leaves were in better condition and the oil film persisted about five times as long.

In making tests with apples it was observed that the cutinized integument of the apple is covered with free wax which is dissolved by ordinary mineral oil. The dissolved wax, however, becomes pasty after a few days and dust particles settling thereon do not become wet. When my solute is added to the oil it does not flux with this wax,—the oil film remains intact, the surface remains wet and shiny, dust particles are wetted when they settle thereon, and the free oil persists. This is particularly important in combating coddling moth or crawling insects because it acts as a repellent and as an ovicide, particularly when the oil is impregnated with rotenone, toxicarol, deguelin, or some other repellent or poison which is effective against insects but not harmful to warm blooded animals.

Tests carried on with red scale on lemons showed that the kill of red scale was actually increased as compared to the kill effected by oils without the solute, and particularly with more viscous oils it was found that the depression under the scale was filled with oil. It appears then that my solute prevents penetration of the oil into the plant structure without lessening its effect on plant parasites, and that its toxicity against the latter is actually increased.

As I see it, the parasites are practically immersed in oil and the oil is sufficiently persistent to insure their suffocation, even if the oil does not act as a contact poison. On the other hand, it may be that the waxy coating on insects is sufficiently different from that on leaves so that there is a selective penetration effect.

Kerosene in the form of a quick-breaking emulsion (2% oil and 0.02% calcium caseinate) was found to have no effect on red scale,—the kill was only 45%, which is about the natural mortality. Kerosene with 10% of a mixture of equal parts of glyceryl oleate and naphthenate, also applied at 2% with one-half pound of spreader per 100 gallons of spray, gave a kill of 83.5%, and kerosene emulsion of simlar proportions have given kills of 98% to 100%.

My tests showing the penetration of oil into apples explains the results obtained by Newcomb and Yothers in United States Department of Agriculture Bulletin 281 (February 1932) wherein it was found that the oil spray is only effective in combatting coddling moth for about three days after application. My solute makes the oil film persist for a month or two, and the persistency can be controlled by varying the volatility of the oil and the thickness of the film in the manner hereinabove described. Thus one or two sprayings may protect an orchard for an entire season.

It will be obvious to those skilled in the art that suitable modifications may be made to the formulæ hereinabove set forth. Fungicide may be added, particularly oil soluble copper compounds such as copper naphthenate. The copper naphthenate has somewhat the effect of the spreader and may take the place thereof. The copper naphthenate may be dissolved in the glyceryl naphthenate or warm oil solution thereof before it is added to the main body of oil. I may use about 5% to 25% of the copper naphthenate, depending on the ratio of glyceryl naphthenate to oil. The copper compound should be about 0.25% to 1.0% of the oil which finally forms the film on the leaf.

Aluminum naphthenate, zinc naphthenate and other compounds of this type may be used instead of copper or calcium naphthenate. In any case, that particular compound should be selected which is least harmful to the plant which is to be sprayed. Also other fungicides or poisons may be added if the situation so demands.

While I have described in detail preferred embodiments of my invention it should be understood that I do not limit myself to any of these details except as defined by the following claims which should be construed as broadly as the prior art will permit.

I claim:

1. An anti-parasitic spray for application to sensitive foliage which comprises a mineral oil compounded with about two to ten per cent of a solute of the class which consists of oil-soluble hydroxy esters of high molecular weight organic acids with polyhydric alcohols.

2. An anti-parasitic oil spray for application to sensitive foliage which comprises a mineral oil containing about one to ten per cent of glyceryl naphthenate.

3. An anti-parasitic oil for application to sensitive foliage which comprises a mineral oil combined with about one to ten per cent of glyceryl naphthenate and a small amount of an electrolyte having a polyvalent metal cation.

4. The combination of claim 1 wherein the composition includes an electrolyte having a polyvalent metal cation.

5. An emulsion base for the preparation of anti-parasitic oil emulsions for application to sensitive foliage which comprises a solution in mineral oil of about two to ten per cent of a solute of the class which consists of oil-soluble hydroxy esters of high molecular weight organic acids in combination with an oil soluble copper compound.

6. The method of regulating the penetration of oil into the plant leaves which comprises adding to said oil an amount up to about 10% of oil soluble hydroxy esters of high molecular weight organic acids.

7. The method of applying an oil film to the leaves of trees and plants which comprises adding to the oil about one to ten per cent of an oil soluble hydroxy ester of high molecular weight organic acids, emulsifying the oil with its added compound by agitation with water, converting said emulsion into a quick-breaking type, and with continuous agitation, spraying said emulsion onto said leaves.

8. An oil spray base comprising a mineral oil having an angle of contact (on carnauba wax) of about 30° to 36°, and containing in solution a small amount of an hydroxy ester of high molecular weight organic acids.

9. The oil spray base of claim 8 wherein the compound is glyceryl naphthenate.

10. The oil spray base of claim 8 wherein the compound is a naphthenic ester of a polyhydric alcohol.

11. The method of simultaneously varying the surface tension characteristics and the penetration tendency of an oil which comprises adding thereto a small amount of glyceryl naphthenate.

12. The method of claim 7 wherein the formation of the quick breaking emulsion is effected by the use of a naphthenic acid salt of a polyvalent metal cation.

13. The method of claim 7 wherein the formation of the quick breaking emulsion is effected by the use of aluminum naphthenate.

14. The composition of claim 1 which also includes a naphthenic acid salt of a polyvalent metal cation.

15. The composition of claim 1 which also includes aluminum naphthenate.

16. An anti-parasitic spray for application to sensitive plant foliage which comprises a mineral oil compounded with about two to ten per cent of partially esterified glycerol oleate.

17. An anti-parasitic spray for application to sensitive plant foliage which comprises a mineral oil compounded with a small amount of partially esterified glycerol oleate and an amount of an oil soluble salt of a polyvalent metal cation to effect the release of oil on contact with the plant foliage.

18. An anti-parasitic spray for application to sensitive plant foliage which comprises a mineral oil compounded with a small amount of partially esterified glycerol oleate and sufficient aluminum naphthenate to effect the release of oil on contact with the plant foliage.

HUGH KNIGHT.